May 11, 1971          D. J. BELKNAP          3,578,429

APPARATUS FOR MAKING MINIATURE INCANDESCENT LAMPS

Filed Sept. 19, 1968          6 Sheets-Sheet 1

INVENTOR

DONALD J. BELKNAP

*Shapiro and Shapiro*

ATTORNEYS

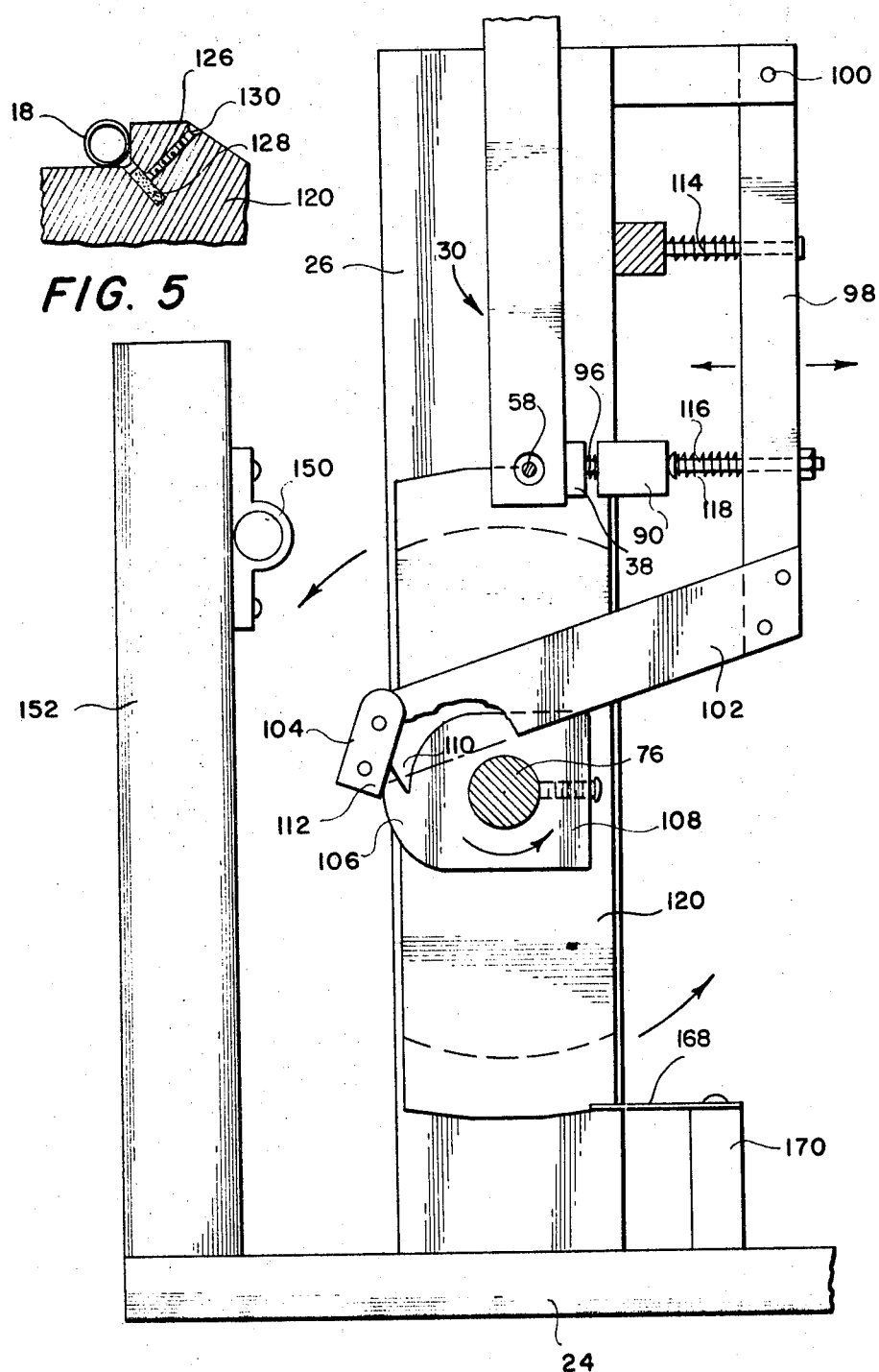

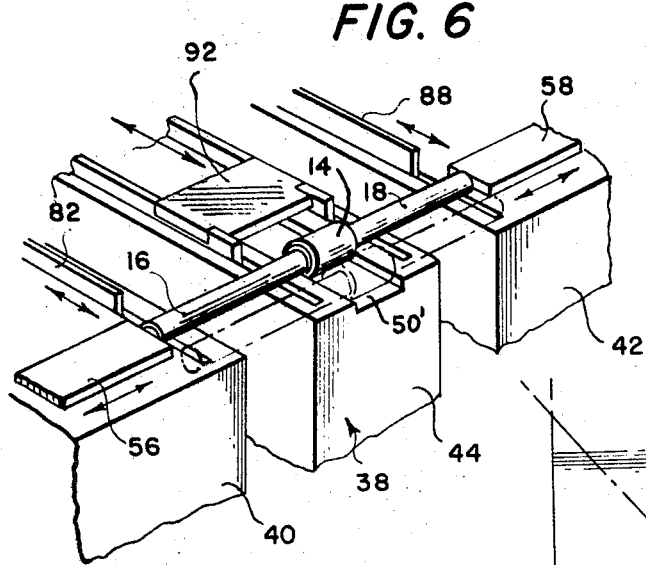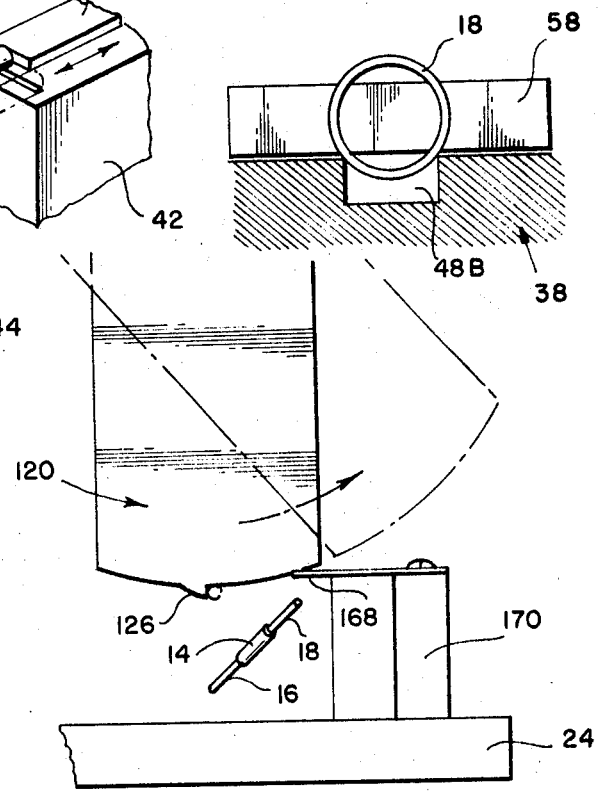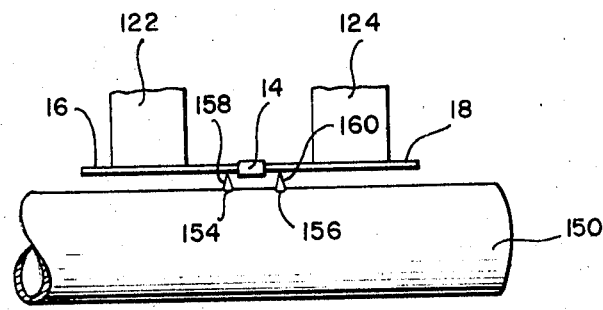

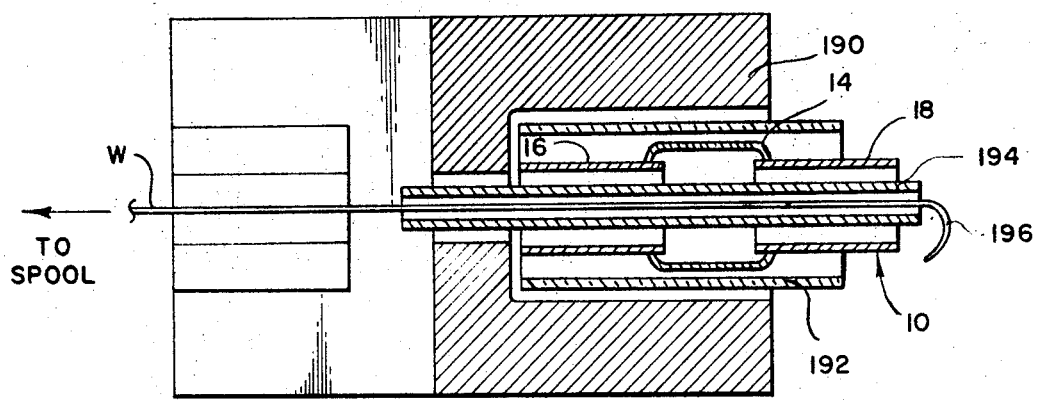
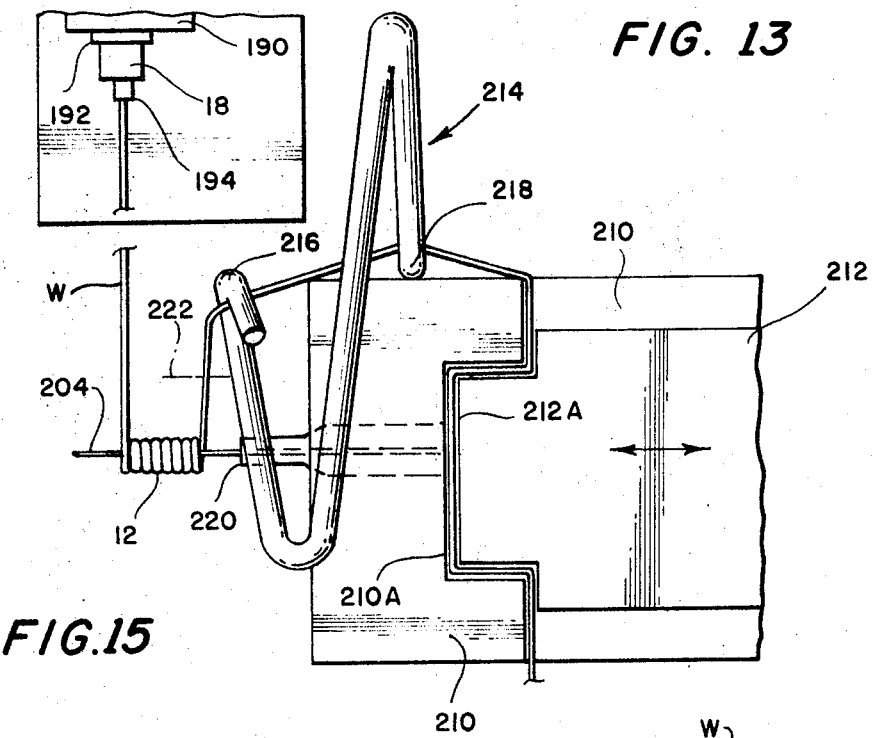
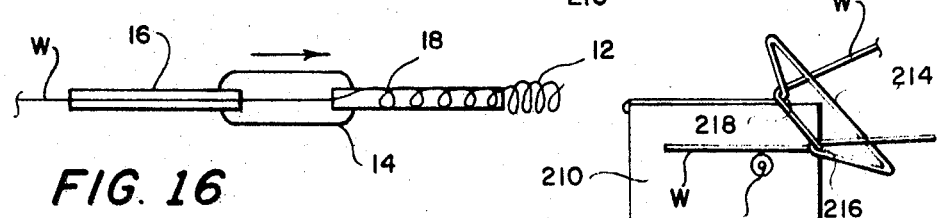

United States Patent Office 3,578,429
Patented May 11, 1971

3,578,429
APPARATUS FOR MAKING MINIATURE INCANDESCENT LAMPS
Donald J. Belknap, 302 Patterson Court, Takoma Park, Md. 20012
Filed Sept. 19, 1968, Ser. No. 760,852
Int. Cl. C03c 27/02; H01j 9/00
U.S. Cl. 65—154
17 Claims

ABSTRACT OF THE DISCLOSURE

Miniature incandescent lamp envelopes are formed seriatim by feeding the components by gravity-feed chutes to an assembly station where the envelope sleeves are supported on a table having aligned grooves for receiving the sleeves. The end sleeves are partially inserted into the central sleeve by pusher members. The resulting assemblies are then conveyed by a rotating member to a sealing station. Filaments are formed and inserted into the envelopes by pulling a length of wire through a tubular sleeve, inserting an envelope over the sleeve and winding a filament coil from the end of the filament wire projecting from the sleeve. The coil winder comprises a mandrel about which the coil is formed, and a wire guide for engaging the wire at locations spaced laterally from the mandrel. A solenoid is supported for rotation about the axis of the mandrel. The solenoid has two jaws which grip the wire. Both the jaws and the mandrel are rotated with the solenoid. The mandrel is also mounted for axial reciprocation.

BACKGROUND OF THE INVENTION

This invention relates to miniature incandescent lamps and the like, especially microminiature lamps having axial geometry, and to methods and apparatus for making such devices.

The microminiature incandescent lamps described in the applicant's prior Pats. Nos. 3,040,204; 3,193,906; and 3,226,218, meet the need for very small, low-current indicator lamps which are compatible in size with today's microminiature electronic circuitry. Although axial lamps of this type are now being manufactured, they are relatively expensive because of the need for hand labor and specialized techniques. Jigging is necessary in order to position properly and align the parts during assembly. Heat-sealing the lamps within a vacuum environment, such as that produced in a bell jar, is inconvenient and results in somewhat reduced efficiency and shortened lifetime because of the trapping within the lamp envelope of gases liberated by the molten glass of the envelope at the time of sealing.

Other types of small incandescent lamps currently being manufactured do not require painstaking jigging and the inconvenience of bell jar sealing and are consequently less expensive. However, these lamps of a more conventional design usually have both leads projecting from the same end of the lamp and employ a glass tubulation for evacuating the envelope. This single-ended construction, as well as the need for protecting the tipped-off end of the glass tubulation with a metal cap or potting material, makes even the smallest of these lamps very much larger than the axial lamps of the applicant's above-mentioned prior patents. In addition the conventional lamps suffer from reduction in efficiency and lifetime brought about by the evolution of gas during the final tip-off of the glass tubulation.

The applicant's copending application Ser. No. 563,844, filed July 8, 1966, for "Miniature Incandescent Lamps and the Like and Methods of Making the Same," describes an improved incandescent lamp and methods of manufacturing the same. Some of the important distinctions of this lamp with respect to prior lamps are that the envelope is formed from a thin-wall glass sleeve central section, the ends of which are heat-sealed to metal terminal sleeves partially inserted therein axially, there being no deformation of the major portion of the glass sleeve intermediate the ends. A filament is inserted into the envelope axially and its ends are engaged by the metal terminal sleeves, which are pinched off in cold-welding operations to seal the envelope. It is to improvements in this highly advantageous lamp and the methods and apparatus for making the same that the present application is directed.

BRIEF DESCRIPTION OF THE INVENTION

It is accordingly a principal object of the present invention to provide improvements in the lamp construction and the methods of making the same described in the said copending application, and furthermore, to provide apparatus for facilitating the mass production of such lamps and the like.

More specifically, it is an object of the invention to provide lamp constructions and methods and apparatus for making the same which permit the manufacture of miniature lamps at lower cost, in greater quantities, and with fewer rejects than heretofore possible.

A further object of the invention is to provide a microminiature lamp which ensures reliable contact between the ends of the filament and the terminals of the lamp.

Another object of the invention is to provide improved apparatus and methods for manufacturing lamp envelopes and the like.

A further object of the invention is to provide improved apparatus and methods for winding filament coils and the like and for inserting the same into envelopes.

Briefly stated by way of example, the invention is concerned with a microminiature incandescent lamp of axial geometry and having a thin-wall tubular envelope with a light-transmissive intermediate section and opposite conductive end sections sealed to the intermediate section prior to assembly of the envelope with a filament. The envelopes are formed seriatim by feeding the components to an assembly station where a pair of end sections is partially inserted into an intermediate section. The thus-formed assembly is conveyed to a sealing station where heat is applied locally to the conductive end sections to seal the end sections to the intermediate section. The envelope is then supported upon a tubular guide through which a length of filament wire is drawn, and the end of the filament wire is engaged with a filament winder for forming the filament coil. After formation of the coil the envelope is drawn over the coil in an operation which stretches the coil and ensures good electric contact with the end sections of the envelope. The end sections are pinched off by cold-welding operations which securely anchor the corresponding extremities of the filament coil. Prior to complete sealing of the envelope by the pinch-off, the envelope is evacuated.

BRIEF DESCRIPTION OF THE DRAWINGS

The foregoing and other objects, advantages, and features of the invention and the manner in which the same are accomplished will become more readily apparent upon consideration of the following detailed description of the invention taken in conjunction with the accompanying drawings, which illustrate preferred and exemplary embodiments, and wherein:

FIG. 4 is a vertical sectional view taken along line 4—4 of FIG. 2 and illustrating the mechanism for advancing the lamp assemblies and the manner in which lamp assemblies are conveyed to a sealing station and then to a pick-off station;

FIG. 5 is an enlarged vertical sectional view illustrating a detail of the lamp assembly conveyor;

FIG. 6 is a diagrammatic perspective view illustrating the manner in which end sections are inserted into the central section of the lamp envelope and showing the implements for advancing the lamp assemblies from the assembly station and holding back successive lamp envelope components;

FIG. 7 is an enlarged vertical sectional view illustrating detais of the manner in which the envelope end sections are supported and moved at the assembly station;

FIG. 8 is a fragmentary front elevation view showing the manner in which lamp assemblies are carried upon the conveyor;

FIG. 9 is a diagrammatic plan view illustrating the manner in which heat is applied to the envelope assembly at the sealing station;

FIG. 10 is a diagrammatic side elevation view illustrating the operation of the pick-off for removing lamp assemblies from the conveyor;

FIG. 13 is an enlarged fragmentary vertical sectional view illustrating the manner in which a lamp envelope is supported during the formation of its filament;

FIG. 14 is an enlarged side elevation view illustrating details of the apparatus for forming the filament coil;

FIG. 15 is an enlarged plan view illustrating further details of the apparatus for forming a filament; and FIG. 16 is a vertical sectional view illustrating the manner in which a filament is inserted into its envelope.

DETAILED DESCRIPTION OF THE INVENTION

Figure 1:
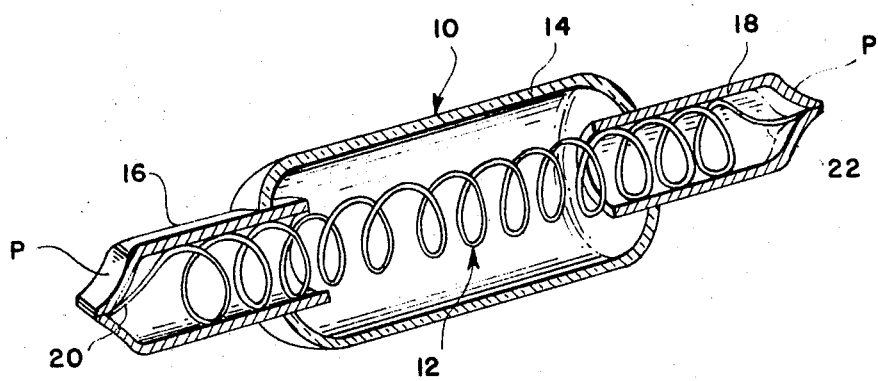
FIG. 1 is a longitudinal sectional view of a lamp of the invention shown in perspective and illustrating the relationship of the intermediate and end sections of the envelope with a filament coil and the retention of the filament coil and sealing of the envelope by mechanical pinch-offs.

Referring to the drawings, and initially to FIG. 1 thereof, an incandescent lamp constructed in accordance with the invention comprises two basic parts: an envelope 10 and a filament 12. The envelope has a main, intermediate or central section 14, preferably of thin-wall glass or ceramic tubing of circular cross-section, and a pair of end sections 16 and 18, preferably of metal tubing of circular cross-section. For example, the glass section may be formed of 7052 or lead glass, while the metal sections may be formed of Alloy 52, Kovar or platinum. The metal sections extend from opposite ends of the glass section in alignment and are hermetically sealed to the ends of the glass tubing by glass-to-metal seals, as will be described more fully hereinafter. A typical envelope for a microminiature incandescent lamp may have a central section .06 inch long with 0.0225 inch O.D. and 6 mil wall thickness and end sections 16, 18. 0.025 inch long with .0145 inch O.D. and .005 inch I.D. The filament 12 may comprise sixteen turns of .00025 inch Tungsten wire wound on a 0.004 inch diameter mandrel, for example. As will be described more fully hereinafter, the filament coil is stretched longitudinally as it is inserted into the envelope, and filament turns at each end of the coil engage the metal terminals 16 and 18.

One end section, such as 16, is pinched-off at P with an appropriate tool to grip the corresponding extremity 20 of the filament and to form a hermetic (vacuum-tight or gas-tight) seal. The pinch-off is formed by a cold-welding operation, that is, by the application of pressure without additional heat. Soft metals, such as fully annealed aluminum, .070 inch O.D. x 010 wall Kovar, annealed nickel, thin-wall 52 alloy and platinum are typical materials which can be pinched-off in this manner. Suitable tools for this operation are manufactured by CHA Industries, 1215 Chrysler Drive, Menlo Park, Calif. The lamp is evacuated through the open end section 18, which is then pinched off in the same manner as end section 16, to grip the extremity 22 of the filament and to form another hermetic seal. The completed lamp can be placed in a spring clip socket to hold the lamp and provide end connections, or leads can be soldered to the metal ends.

Figure 2:
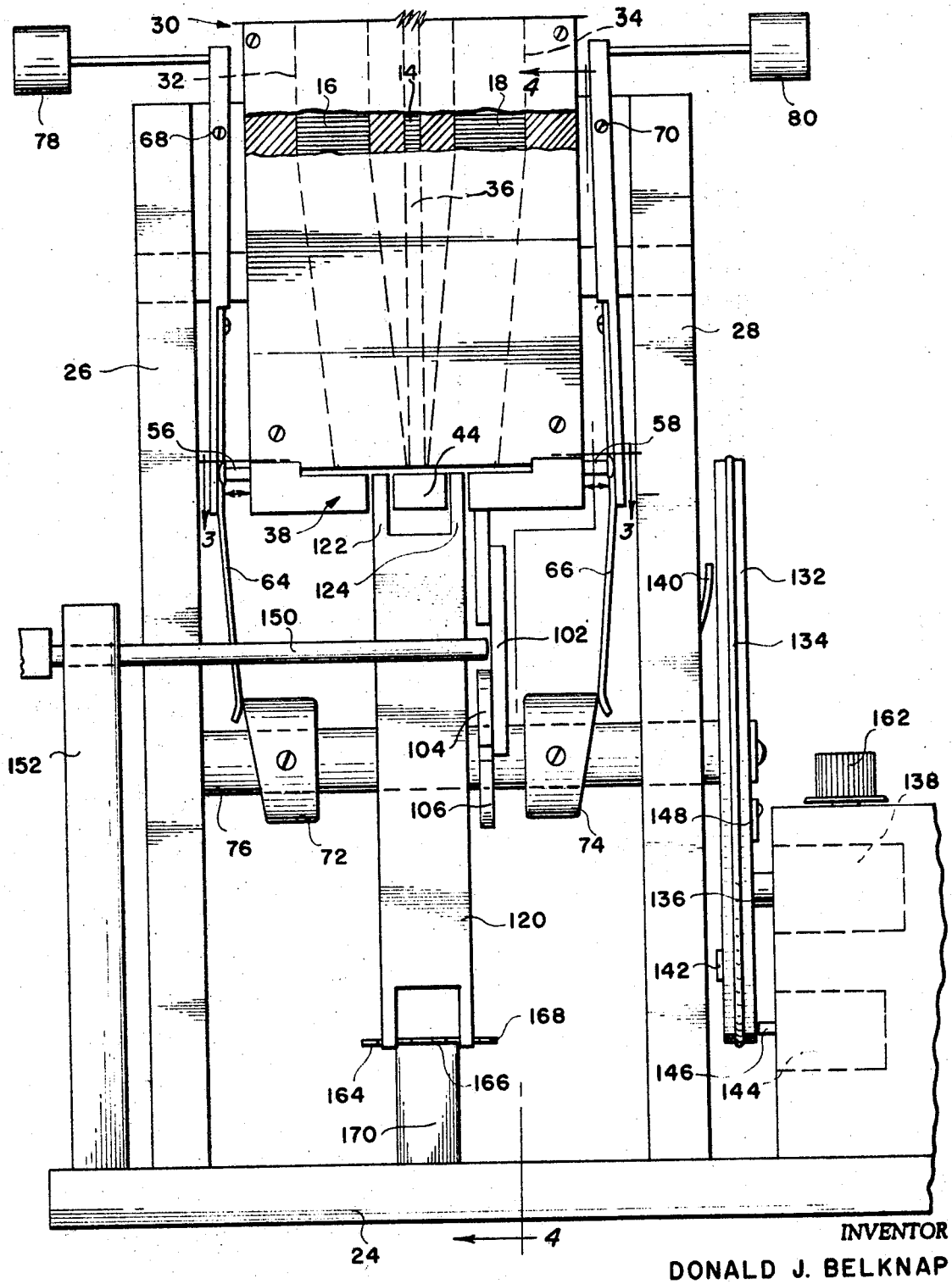
FIG. 2 is a front elevation view of apparatus for forming lamp envelopes.

The lamp envelopes may be manufactured as illustrated in FIGS. 2–10. Referring to FIG. 2, the envelope forming machine comprises a frame including a base 24 and a pair of spaced uprights 26 and 28. Supported upon the frame above the base is a magazine 30 having three chutes 32, 34, and 36. Adjacent to their tops chutes 32 and 34 are substantially parallel, but as they progress downwardly these chutes converge toward opposite sides of chute 36. The tops of the chutes are open to receive the envelope components, chutes 32 and 34 receiving lengths of metal tubing (e.g., 375 inch long) and chute 36 receiving lengths of glass tubing, all of which are stacked vertically. The components may be pre-loaded into auxiliary magazines placed on top of magazine 30. The widths and depths of the chutes are chosen to provide sufficient freedom for serial vertical movement of the envelope components without jamming. While unassisted gravity feed may be employed to advance the components along the chutes, movement may be facilitated by adding weights to the top of each stack of components to act as followers.

Figure 3:
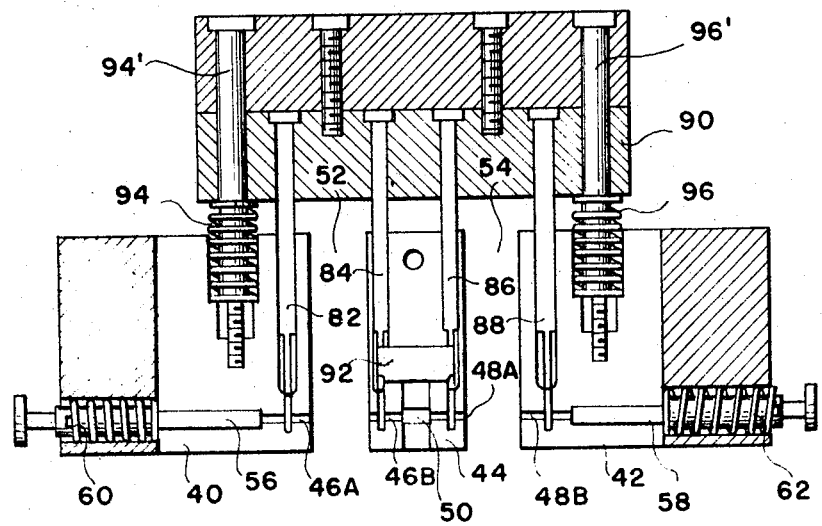
FIG. 3 is a horizontal sectional view taken along line 3—3 of FIG. 2 and illustrating the mechanism for holding the envelope components, inserting the end sections partially into the intermediate secion, and advancing the envelope assemblies.

A table 38 is mounted on the frame at the assembly station located slightly below the bottom of the chutes. As shown in FIG. 3 the table has a pair of end portions 40 and 42 and a central portion 44 provided with aligned notches 46A–46B, 48A–48B, and 50. Notch 46A–46B is located directly below the bottom exit of chute 32, notch 48A–48B directly below the bottom exit of chute 34, and notch 50 directly below the bottom exit of chute 36. The metal end sleeves of the envelope bridge the gaps 52 and 54, and the glass tubing sections are centrally aligned by notch 50. The lowermost envelope component in each chute thus is received in the corresponding notch. The tubular envelope components rest in their respective notches as indicated in FIG. 7, wherein one of the metal sleeves is shown supported in its receiving notch. The notches may be rectangular in cross-section and somewhat narrower than the associated tubular components so that the sleeves project from the notches as shown.

At the appropriate moment metal sleeves supported upon notches 46A–46B and 48A–48B are partially inserted axially into the glass sleeve supported upon notch 50. This operation is performed by pusher pins 56 and 58 which reciprocate upon the table 38 in guide bores axially of the envelope components. The pusher pins are normally held retracted by return springs 60 and 62 and are moved toward each other by cam follower arms 64 and 66 (see FIG. 2) pivoted at 68 and 70 upon the frame and driven by cams 72 and 74 fixed to a rotary shaft 76 journaled upon the uprights 26 and 28. Weights 78 and 80 fixed to the upper ends of the cam follower arms urge the follower arms against the inclined end surfaces of the cam discs 72 and 74. Alternatively, bias springs may be employed for this purpose. The flattened sleeve-engaging ends of the pusher pins 56 and 58, the height of which is less than that of metal sleeves 16 and 18, are shown in FIG. 6 urging the metal sleeves into the glass sleeve 14 about 0.010 inch.

The envelope assembly formed by the partial insertion of the metal sleeves into the glass sleeve is now to be conveyed to a sealing station. To advance the envelope assembly from the assembly station initially, further pusher pins are provided. These are shown in FIG. 3, at 82, 84, 86, and 88. The pins are fixed to a block 90 and reciprocate in unison in guide bores upon the table 38. Pins 84 and 86 are joined by a pusher plate 92 slightly behind their forward ends.

Block 90 is normally held retracted by return springs 94 and 96 and is cam-driven to engage the pusher pins with the envelope assembly. The drive mechanism is shown in FIG. 4 and comprises an arm 98 pivotally suspended at 100 from the frame and having an angulated forearm 102 above the shaft 76 and provided with a cam follower block 104 fixed to its tip. The cam follower block is engaged by the curved circumferential ramp 106 of a cam disc 108 fixed to shaft 76. The cam has a notch 110 into which the point 112 of the follower block 104 enters to disengage the follower from the cam after the block has been driven by the ramp 106 to cause the pins 82, 84, 86, and 88 and the plate 92 to engage the lamp assembly and move it out of the supporting notches, beneath the slightly elevated lower edge of the front plate of magazine 30, and onto the ledge at the front of the table 38 as shown in phantom lines in FIG. 6. A groove 50' is provided in the table portion 44 to accommodate the glass sleeve 14 as the assembly is moved forward. Only the lowermost components are advanced, the succeeding components resting on the pusher elements 82, 84, 86, 88, and 92 and being held back by the front cover of the magazine 30. When the cam follower block 104 drops into the notch 110 of cam 108, arm 98 is retracted by return spring 114 (FIG. 4), and block 90 is retracted by return springs 94 and 96 (FIG. 3) surrounding guide pins 94' and 96' to retract the pusher pins 82, 84, 86, and 88 and pusher plate 92 and to permit the next envelope components of the stacks to fall into the associated notches of the table 38. The drive connection between block 90 and arm 98 may include a pin 116 urged to the left in FIG. 4 by a compression spring 118 of sufficient strength to overcome the resistance of springs 94 and 96, but which is compressible in the event of jamming during advancement of lamp envelope assemblies.

After the pusher pins 56 and 58 have moved to insert a pair of metal sleeves partially into a glass sleeve and have retracted, and after the thus-formed envelope assembly is initially advanced by the pusher pins 82, 84, 86, and 88 and plate 92, a conveyor picks up the envelope assembly. In the form shown the conveyor comprises an arm 120 fixed to the shaft 76. The ends of the arm are bifurcated to form fingers 122 and 124 (spaced, e.g., .300 inch, and .175 inch wide) which pass through the gaps 52 and 54 of the table 38 and engage the metal sleeves 16 and 18 as shown in FIG. 8. Each finger has a shoulder 126 (FIG. 5) which engages the associated metal sleeve almost centrally thereof so as to sweep the envelope assembly from the table 38. In order to retain the lamp assembly upon the conveyor as the conveyor turns downwardly, a small magnet 128 is recessed in each finger at the active end of arm 120 (it being assumed that only one end of arm 120 is active in the illustrative example, although both ends may be used actively if suitably contoured cams for actuating the pusher pins described above are provided). The magnets are held in position by set screws 130 and attract the metal end sleeves of the envelope assembly. FIG. 4 illustrates the conveyor arm 120 just as it is about to pick up a lamp assembly from the table 38.

Shaft 76, and hence the conveyor 120 and the cams 72, 74, and 108, is driven by a pulley 132 (FIG. 2) fixed to one end of the shaft. The pulley is driven by a belt 134 in turn driven by a smaller pulley (hidden in FIG. 2 by pulley 132) upon the shaft 136 of a small electric motor 138 supported on the base 24. It is desired to arrest the movement of shaft 76 when the conveyor reaches the sealing station (to be described) for a time sufficient to apply the desired amount of heat to seal the metal sleeves to the glass sleeve of the envelope. For this purpose a microswitch is mounted upon the frame and has its actuator arm 140 adjacent to the pulley 132 where it may be engaged by an abutment 142 carried by the pulley. When the abutment contacts the actuator arm, the microswitch is opened, de-energizing the electric motor and also de-energizing a normally energized solenoid 144. The solenoid is supported upon the base 24 so that when the solenoid is de-energized, its spring-loaded armature 146 is projected to a position adjacent to pulley 132, where it may be engaged by an abutment 148 carried by the pulley. The operation is such that the microswitch is actuated by abutment 142 just before the conveyor arm 120 reaches the sealing station, and the drive train coasts until abutment 148 engages armature 146, stopping the movement of shaft 76 with the envelope assembly carried by conveyor 120 precisely located adjacent to a heater 150 at the sealing station.

The heater may be a length of copper tubing projecting horizontally from a base-supported standard 152 and closed at its salient end. Pipe 150 is connected to a source of gas, such as a suitably regulated mixture of propane and oxygen, and has a pair of tiny holes 154 and 156 (FIG. 9) in its side wall facing the conveyor arm 120. Tiny jets of burning gas 158 and 160 extend from the openings 154 and 156 when the gas is ignited (the gas may burn continuously during operation of the apparatus) to heat regions of the metal sleeves 16 and 18 remote from the glass sleeve 14. The jets may be spaced apart .125 inch for a lamp of the dimensions given above, so that the heat for sealing the metal sleeves to the glass sleeve must travel along the metal sleeves to reach the glass sleeve. The envelope assembly is maintained in the vicinity of the heater for just sufficient time to cause the ends of the glass adjacent to the metal sleeves to seal upon the metal sleeves. Deformation of the glass tubing is thus restricted to the regions immediately at the seals. With microminiature envelopes the glass section is so light weight that the glass section aligns itself axially with the metal sections, due to the adhesion of the melted glass, despite the fact that the glass section is suspended from the somewhat smaller diameter metal sections.

The dwell of the envelope assembly at the heater station is controlled by a conventional time-delay relay, the delay-time control knob of which is indicated at 162 in FIG. 2. This relay is actuated conventionally by the same microswitch which controls the motor 138 and the solenoid 144 and commences a delay period when the microswitch de-energizes the motor and the solenoid. At the end of the delay period the motor and the solenoid are re-energized by the relay, and conveyor arm 120 rotates again, conveying the envelope to a pick-off station.

The pick-off is in the form of three sheet metal fingers 164, 166, and 168 which project horizontally from a standard 170 on the base 24. The end of the conveyor arm 120 sweeps under the pick-off, fingers 122 and 124 of the arm passing through the spaces between fingers 164, 166, and 168 of the pick-off, so that the envelope is swept from the conveyor by the pick-off fingers and drops as shown in FIG. 10 to a suitable receptacle (not shown). The finished envelopes may be cleansed of any oxidation formed during the heating by an acid etching agent, such as concentrated hydrochloric acid, and then may be washed and dried.

The next principal step in the manufacture of a lamp in accordance with the invention is the forming and insertion of the lamp filament. FIGS. 11–16 illustrate these operations.

Figure 11:
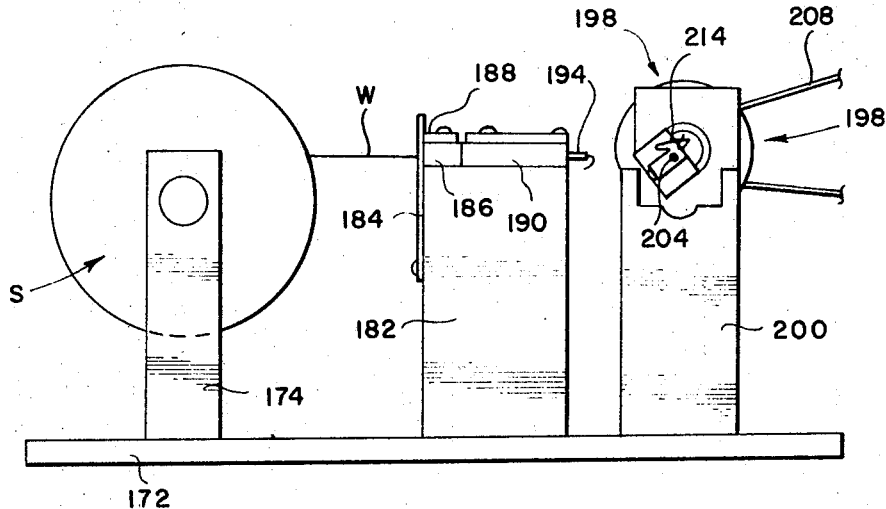
FIG. 11 is a side elevation view illustrating apparatus for forming filament coils and inserting the same into envelopes in accordance with the invention.
Figure 12:
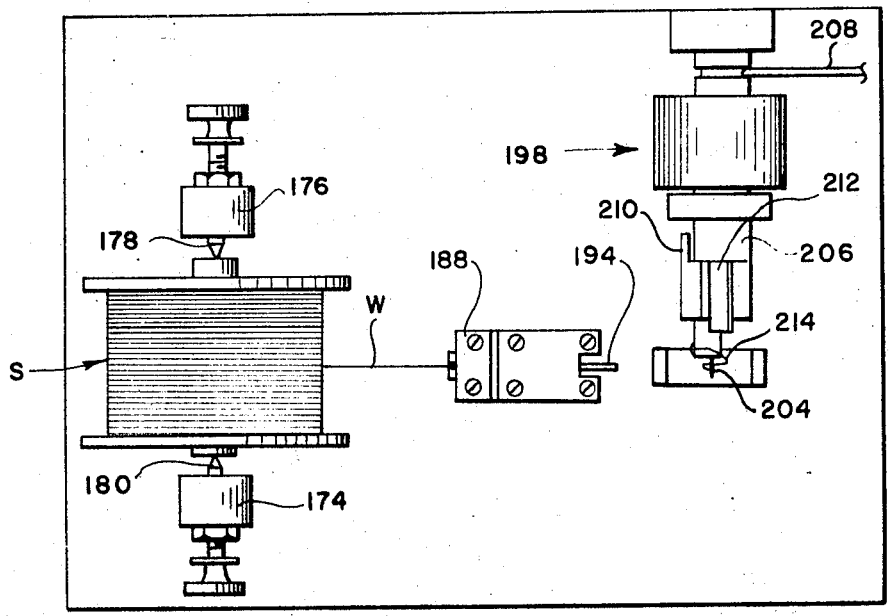
FIG. 12 is a plan view of the apparatus of FIG. 11.

As shown in FIGS. 11 and 12, a spool S of filament wire W, such as the type previously described, is rotatably supported upon a base 172 by means of spaced uprights 174 and 176 provided with pivots 178 and 180 for the spool. One end of the very fine filament wire is extended from the spool to a table 182 mounted upon the base 172. Here the wire passes through an opening in a guide 184 and through an opening in a body of resiliently compressible material 186, such as rubber, which may be variably compressed by means of a screw-driven plate 188 to create an adjustable drag for setting the tension in the filament wire. The wire then passes through an axial opening in a block 190. Block 190 (see FIG. 13) has a recess which receives and supports a guide sleeve 192 into which an envelope 10 of the invention may be inserted. The envelope is inserted over a stainless steel tube 194 held in the central bore of the block 190 and long enough to project from an envelope fully inserted into sleeve 192. The filament wire is pulled through the stainless steel sleeve 194 before the envelope is slipped into sleeve 192, so that the insertion of the envelope causes the free end 196 of the filament wire to bend laterally as shown.

The free end 196 of the filament wire is grasped and pulled to the filament winder 198 (FIGS. 11 and 12) supported on a block 200 adjacent to the table 182. The filament wire passes over a fine mandrel 204 which projects transversely to the wire from its support upon the armature of a solenoid 206. The winding head comprising the solenoid is supported upon the block 200 for rotation about the axis of the mandrel 204 and is driven by a belt 208 from a drive pulley (not shown). Slip ring connections (not shown) are used to supply the solenoid with current. The frame of the solenoid carries a jaw 210, and the reciprocating armature of the solenoid carries a jaw 212. Both jaws and the mandrel are rotatable with the solenoid, the mandrel being fixed to jaw 212. Jaw 210 carries a cantilevered wire guide 214 (FIG. 14) which is bent to provide a pair of V-shaped guide elements 216, 218, elements 216 and 218 being located as shown in FIGS. 14 and 15 so that the filament wire may be drawn over the mandrel, through guide element 216, through guide element 218 and then between the mating portions 210A and 212A of the jaws 210 and 212. FIG. 15 shows the guide 214 rotated counter-clockwise 90° from the position of FIG. 14.

When the solenoid 206 is energized, mandrel 204 is retracted into its guide sleeve 220 upon jaw 210 and the jaws are separated. The filament wire is threaded through the guide elements 216 and 218 and placed between the jaws. Then the solenoid is de-energized, so that the armature return spring (not shown) drives jaw face 212A against jaw face 210A to grip the free end of the filament wire and to extend the mandrel under the wire. Guide element 216 holds the wire at a location spaced laterally from the mandrel. If the armature of the solenoid is then turned about the axis of the mandrel, the filament coil will be wound upon the mandrel as shown at 12 in FIG. 15. When a desired number of turns has been wound, the solenoid is energized to withdraw the mandrel, and the filament wire is cut as indicated at 222 in FIG. 15, so that the coil hangs from the wire attached to the supply spool.

The outer diameter of the filament coil is made slightly larger than the inner diameter of the metal end sections of the envelope, for example .006 inch O.D. at compared to .005 inch I.D. for the metal end sections. If now the envelope which has been resting upon block 190 is withdrawn from sleeve 192 and pulled over the filament coil, the coil will have to stretch longitudinally, so as to increase the spacing of the turns and reduce their outer diameter, in order for the filament coil to enter the envelope. This is illustrated in FIG. 16. The envelope is advanced over the filament coil until the coil is entirely contained within the envelope and until filament turns at the opposite ends of the coil are located within the respective end sections of the envelope. The portion of the filament coil attached to the spool may then be severed to release the filament for retention in the envelope. The envelopes may now be evacuated and sealed.

Suitable evacuating and sealing apparatuses and methods have been described in the aforesaid copending application and are not per se the present invention. As set forth in that application, a plurality of envelope-filament units may be evacuated and sealed together. The lamps may be mounted upright upon an apertured block by inserting them end-wise into the block apertures, so that one metal end section of each lamp is received in an aperture of the block. The block may contain a layer of compressible material which grips and seals about the exterior of the inserted metal end sections, and the block apertures may be placed over the nipples of the evacuation system. The upper metal sleeves of the supported lamps may then be pinched off at a region intermediate the ends of the sleeves by the curved jaws of a mechanical pinch-off tool of the type described previously. The jaws of the tool come together upon the metal tubing, flattening the tubing where engaged by the jaws and pinching the tubing until it is severed into two axially separated pieces. The piece sealed to the glass section of the envleope becomes the metal terminal at one end of the lamp. The mechanical pinch-off operation hermetically seals the metal sleeve without the addition of heat, thereby avoiding the generation of gas and avoiding oxidation of the metal. The end of the filament coil becomes clamped in the pinch-off, securely fixing the filament coil to the terminal sleeve of the envelope.

After the pinching off of one end sleeve, the lamps are evacuated through the opposite end sleeve inserted in the supporting block. Heat may be applied during the evacuation to bake out the lamps if desired. Also, the filaments may be flashed to de-gas them prior to final sealing of the lamps. Finally, the lower terminal sleeves are pinched off in the manner just described, so that both ends of the filament coil are securely gripped and the lamp is completely sealed.

By virtue of the invention lamp envelopes and filaments may be formed and assembled and the lamps completed expeditiously in large quantities by mass production techniques. The finished lamp has the potential of longer life than prior art lamps because of the avoidance of the generation of gas during the final sealing of the lamps. The substantial electrical and mechanical contact of the end turns of the filament coil with the terminal sleeves of the lamp ensures good mechanical support as well as excellent electrical continuity, thereby avoiding intermittent contact problems.

While preferred embodiments of the invention have been shown and described, it will be apparent to those skilled in the art that changes can be made in these embodiments without departing from the principles and spirit of the invention, the scope of which is defined in the appended claims. For example, envelope supports may be provided upon block 200 to facilitate placement of the envelope upon stainless steel tube 194.

The invention claimed is:

1. Apparatus for making tubular lamp envelopes and the like, which comprises magazine means for feeding individual central sleeves and individual end sleeves seriatim to an assembly station, means at said assembly station for horizontally supporting said end sleeves in spaced alignment with opposite ends of said central sleeve, means at said assembly station for moving said end sleeves partially only into the ends of said central sleeve to form an assembly, and conveyor means for engaging said assembly and moving it from said supporting means at said assembly station.

2. The apparatus of claim 1, said means for feeding each of said sleeves to said assembly station comprising gravity-feed chutes.

3. The apparatus of claim 1, said means for supporting said sleeves at said assembly comprising a table having aligned grooves for receiving said sleeves, respectively.

4. The apparatus of claim 1, said means for moving said end sleeves into said central sleeve comprising pusher members engaging the remote extremities of said end sleeves and moving said end sleeves toward each other.

5. The apparatus of claim 4, said pusher members and said conveyor means having drive means for operating them in timed sequence.

6. The apparatus of claim 1, said apparatus having a second station to which said assembly is carried by said conveyor means, said second station having means for heat-sealing said end sleeves to said central sleeve.

7. The apparatus of claim 6, said conveyor means having drive means provided with means for interrupting the movement of said conveyor means when said assembly reaches said second station.

8. The apparatus of claim 1, further comprising pusher means at said assembly station for urging said assembly away from said assembly station for engagement with said conveyor means.

9. The apparatus of claim 8, said sleeves being fed to said assembly station in stacks, said pusher means engaging the assembled sleeves at the bottom of the stacks and holding back the unassembled sleeves in the stacks.

10. The apparatus of claim 1, said apparatus having second and third stations to which said assembly is carried by said conveyor means, said second station having means for heat-sealing said end sleeves to said central sleeve, said third station having means for removing said assembly from said conveyor means.

11. The apparatus of claim 1, said conveyor means comprising means for engaging said end sleeves with said central sleeve suspended therefrom.

12. Apparatus for making tubular lamp envelopes and the like, which comprises means for feeding a central sleeve and a pair of end sleeves to an assembly station, means at said assembly station for supporting said end sleeves in alignment with opposite ends of said central sleeve, means at said assembly station for moving said end sleeves partially into the ends of said central sleeve to form an assembly, and conveyor means for engaging said assembly and moving it from said assembly station, said conveyor means comprising a rotating member having means at its periphery for receiving said assembly.

13. The apparatus of claim 12, said receiving means having an abutment for sweeping said assembly from said assembly station.

14. The apparatus of claim 13, said receiving means being provided with magnetic means for retaining the assembly thereat.

15. The apparatus of claim 12, said rotating member having bifurcations adapted to engage said end sleeves, respectively, said supporting means having means defining a pair of gaps bridged by said end sleeves and through which said bifurcations pass, respectively.

16. Apparatus for providing filaments in tubular lamp envelopes, which comprises a sleeve for receiving an envelope thereon and through which a length of filament wire may be drawn, a supply of filament wire having a length of wire extending therefrom through said sleeve, means for applying a drag force to wire drawn from said supply, and a filament coil winder adjacent to said sleeve for winding a filament coil from the wire extending through said sleeve and through an envelope on said sleeve, said coil winder having means for holding the wire extending through said sleeve and having a mandrel about which the coil is formed, said holding means comprising a wire guide for engaging the wire at a location spaced laterally from the mandrel and means for gripping the engaged wire, said coil winder having a rotatable head to which said holding means is fixed for rotation therewith about the axis of said mandrel, said mandrel being mounted on said head for axial reciprocation and having means for projecting the mandrel axially from the head and means for retracting the mandrel axially into the head.

17. The apparatus of claim 16, said head comprising a solenoid on which said holding means and said mandrel are supported, said solenoid having an armature constituting part of said gripping means and upon which said mandrel is mounted for reciprocation relative to another part of said gripping means.

References Cited
UNITED STATES PATENTS

| | | | |
|---|---|---|---|
| 1,977,638 | 10/1934 | Knox | 65—152X |
| 3,270,781 | 9/1966 | Brundige | 140—71.5 |
| 3,315,508 | 4/1967 | Mikina et al. | 140—71.5X |
| 3,365,284 | 1/1968 | Alessi | 65—139X |
| 3,442,302 | 5/1969 | Brady et al. | 140—71.5 |

HOWARD R. CAINE, Primary Examiner

S. R. FRIEDMAN, Assistant Examiner

U.S. Cl. X.R.

29—25.19, 203; 65—155; 72—66; 140—71.5